(12) United States Patent  
Naslund et al.

(10) Patent No.: US 10,432,606 B2
(45) Date of Patent: Oct. 1, 2019

(54) LAWFUL INTERCEPTION OF ENCRYPTED COMMUNICATIONS

(75) Inventors: Mats Naslund, Bromma (SE); Maurizio Iovieno, Salerno (IT); Karl Norrman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 983 days.

(21) Appl. No.: 14/370,862

(22) PCT Filed: Apr. 27, 2012

(86) PCT No.: PCT/EP2012/057788
§ 371 (c)(1),
(2), (4) Date: Jul. 7, 2014

(87) PCT Pub. No.: WO2013/117243
PCT Pub. Date: Aug. 15, 2013

(65) Prior Publication Data
US 2015/0074396 A1    Mar. 12, 2015

(30) Foreign Application Priority Data
Feb. 7, 2012 (GB) .................................. 1202058.2

(51) Int. Cl.
H04L 29/06 (2006.01)
H04L 9/32 (2006.01)

(52) U.S. Cl.
CPC ........ H04L 63/0807 (2013.01); H04L 9/3213 (2013.01); H04L 63/0428 (2013.01); H04L 63/062 (2013.01); H04L 63/306 (2013.01)

(58) Field of Classification Search
CPC ............... H04L 63/306; H04L 63/0807; H04L 63/0428
See application file for complete search history.

(56) References Cited

U.S. PATENT DOCUMENTS

| 7,382,881 B2* | 6/2008 | Uusitalo | H04L 63/06 380/262 |
| 2006/0212933 A1* | 9/2006 | Scoggins | H04L 63/0428 726/11 |

(Continued)

FOREIGN PATENT DOCUMENTS

| CN | 102055585 A | 5/2011 |
| WO | 03/049357 A2 | 6/2003 |

(Continued)

OTHER PUBLICATIONS

International Search Report issued in corresponding International application No. PCT/EP2012/057788, dated Jan. 14, 2013.

(Continued)

*Primary Examiner* — Khalil Naghdali
(74) *Attorney, Agent, or Firm* — Patent Portfolio Builders PLLC

(57) ABSTRACT

A method and apparatus for providing access to an encrypted communication between a sending node and a receiving node to a Law Enforcement Agency (LEA). A Key Management Server (KMS) function stores cryptographic information used to encrypt the communication at a database. The cryptographic information is associated with an identifier used to identify the encrypted communication between the sending node and the receiving node. The KMS receives a request for Lawful Interception, the request including an identity of a Lawful Interception target. The KMS uses the target identity to determine the identifier, and retrieves the cryptographic information associated with the identifier from the database. The cryptographic information can be used to decrypt the encrypted communication. The KMS then sends either information derived from the cryptographic information or a decrypted communication (Continued)

towards the LEA. This allows the LEA to obtain a decrypted version of the communication.

11 Claims, 8 Drawing Sheets

(56) References Cited

U.S. PATENT DOCUMENTS

| | | | |
|---|---|---|---|
| 2007/0297418 A1 | 12/2007 | Lee | |
| 2010/0002880 A1 | 1/2010 | Yoon et al. | |
| 2011/0135093 A1* | 6/2011 | Radatti | H04K 1/00 380/257 |
| 2012/0045064 A1* | 2/2012 | Rembarz | H04L 9/0822 380/281 |
| 2012/0288092 A1* | 11/2012 | Cakulev | H04L 9/0894 380/255 |
| 2013/0182843 A1* | 7/2013 | Buckley | H04L 9/08 380/255 |
| 2013/0188649 A1* | 7/2013 | Carter | H04L 65/1043 370/400 |

FOREIGN PATENT DOCUMENTS

| | | |
|---|---|---|
| WO | 2009/070075 A1 | 6/2009 |
| WO | 2010/031600 A1 | 3/2010 |

OTHER PUBLICATIONS

Written Opinion of the International Searching Authority issued in corresponding International application No. PCT/EP2012/057788, dated Jan. 14, 2013.
"3rd Generation Partnership Project, Technical Specification Group Services and System Aspects; 3G security; Lawful Interception requirements (Release 11);" 3GPP TS 33.106, 3rd Generation Partnership Project (3GPP), Mobile Competence Centre; 650, Route des Lucioles, F-06921 Sophia-Antipolis Cedex, France, vol. SA WG3, No. V11.1.1, Dec. 22, 2011, pp. 1-17, XP050555122.
3GPP SA3LI, "LS on MIKEY-TICKET mid-call interception," 3GPP Draft; SA3LI12 Meeting #44 030R1, 3rd Generation Partnership Project (3GPP), Mobile Competence Centre; 650, Route des Lucioles, F-06921 Sophia-Antipolis Cedex, France, vol. SA WG3, Barcelona, Spain, Jan. 17-19, 2012, XP050577367.
Alcatel Lucent, "TS 33.328 abbreviations and editorial changes," 3GPP TSG-SA3 (Security), S3-100623, 3rd Generation Partnership Project (3GPP), Mobile Competence Centre; 650, Route des Lucioles, F-06921 Sophia- Antipolis Cedex, France, vol. SA WG3, Lisbon, Portugal, Apr. 26-30, 2010, XP050436648.
3GPP, ETSI TS 133 220, V13.0.0 (Jan. 2016), Digital cellular telecommunications system (Phase 2+); Universal Mobile Telecommunications System (UMTS); LTE; Generic Authentication Architecture (GAA); Generic Bootstrapping Architecture (GBA) (3GPP TS 31220 version 13.0.0. Release 13), Technical Specification.
J. Rosenberg et al., Network Working Group, Request for Comments 3261, "SIP: Session Initiation Protocol", Jun. 2002, pp. 1-269.
M. Baugher et al, Network Working Group, Request for Comments 3711, "The Secure Real-time Transport Protocol (SRTP)", Mar. 2004, pp. 1-52.
S. Sakane et al., Network Working Group, Request for Comments 4430, "Kerberized Internet Negotiation of Keys (KIN)", Mar. 2006, pp. 1-40.
J. Mattsson et al., Internet Engineering Task Force (IETF), Request for Comments 6043, "MIKEY-TICKET: Ticket-Based Modes of Key Distribution in Multimedia Internet KEYing (MIKEY)", Mar. 2011, pp. 1-58.
International Preliminary Report on Patentability issued in corresponding International application No. PCT/EP2012/057788, date of completion of the report Dec. 23, 2014.
Extended European Search Report in corresponding European Application No. EP 16 172 684.9 dated Aug. 31, 2016. (Reference D1 was submitted with an Information Disclosure Statement on Apr. 19, 2016).
Office Action in corresponding Chinese Application No. 201280069260.3 dated Oct. 27, 2016. (Reference US2010/0002880A1 was previously submitted with an Information Disclosure Statement dated Jul. 7, 2014).

* cited by examiner

LAWFUL INTERCEPTION OF ENCRYPTED COMMUNICATIONS

TECHNICAL FIELD

The invention relates to the field of lawful interception of encrypted communications.

BACKGROUND

Lawful Interception (LI) allows Law Enforcement Agencies (LEAs) to obtain communication network data for the purpose of analysis or gathering evidence. The data typically includes details of signalling, such as called and calling parties, and in some instances the contents of the call itself.

Communications services such as 3GPP IP Multimedia Subsystem (IMS) offer convenient IP based communication services. To create trustworthy services, such services sometimes offer security (encryption and integrity/authenticity) of the communication sessions. To enable such security it is beneficial if the necessary key management is included in the services, saving users trouble of manually configuring keys etc. Examples of such key management services are Kerberos based systems where a so called Key Management Server (KMS) provides keying material to users. 3GPP IMS (TR 33.328, included herein by reference) deploys a Kerberos-like key management server concept (MIKEY-Ticket, RFC 6043), albeit much more sophisticated and advanced. It will be appreciated that key management services can be used in any type of communications network. By way of example only, the following description focuses on 3GPP IMS networks. In an IMS context, communication services are RTP based and protected (for example, encrypted) using SRTP (IETF RFC 3711) and so the following description discusses RTP and SRTP. However, it will be appreciated that similar procedures may be applied to other security protocols such as TLS, IPsec, and so on, and also used to protect non-RTP communication (e.g. HTTP, MSRP, etc).

Kerberos based systems on a high level works as illustrated in FIG. 1. In FIG. 1, $(x)_y$ denotes an information element x protected, e.g. encrypted, by some key y. By some means, such as out of band communication, the Key Management Server (KMS) 1 shares keys with Alice 2 and Bob 3, K_A, K_B respectively. The KMS 1 also has another key, K' (or means for generating such a key K'). Kerberos-like protocols use a concept of a "ticket", used to carry cryptographic data such as keys, random nonces, cryptographic algorithms, etc. The following numbering corresponds to that of FIG. 1:

S1. Alice 2, wishing to communicate with Bob 3, sends a ticket request to the KMS 1, typically containing the identities of Alice 2 and Bob 3.

S2. The KMS 1 generates a random key, K, and encrypts it using Alice key, K_A and some other key, K' (this may or may not be Bob's key K_B). This second copy of the key K is intended for Bob 3. The KMS 1 returns the two encrypted keys to Alice 2. Bob's copy is typically encoded as a "ticket" that may include other information (e.g. information as exemplified above).

S3. Alice 2 can decrypt her copy of K (using K_A) and forwards the ticket to Bob 3.

S4. Bob 3 asks the KMS 1 to "resolve" the ticket. This typically comprises the KMS 1 decrypting K (using K') and re-encrypting it using K_B.

S5. The re-encrypted copy of K is sent to Bob 3 from the KMS 1.

S6. Bob 3 can now decrypt K (using K_B) and the key K is now shared between Alice 2 and Bob 3 who may use it to exchange protected (e.g. encrypted) data.

Note that some Kerberos variants use K'=K_B. In such situations, messages S4 and S5 may be omitted since Bob 3 then can resolve the ticket locally, using his already known K_B.

It should be noted that the KMS 1 used by Bob 3 and the KMS 1 used by Alice 2 may be two separate KMSs. If they are different KMSs, they must synchronize their data for the system to work. Specifically, as the KMS of Bob 3 receives message S4 (the "ticket resolve"), the KMS of Bob 3 will contact the KMS of Alice 2 (assuming the whereabouts of Alice's KMS, e.g. IP address, URL or the like, is encoded in the ticket) and ask for relevant information regarding K. The inter-KMS communication is typically also encrypted using IPSec or similar protocols, enabling secure transfer of K between the KMSs.

The 3GPP key management system, based on the above described Kerberos principle, works as follows. Messages are transported using HTTP but other protocols may be used (e.g. using Session Initiation Protocol, SIP, RFC 3261). An example network architecture and signalling is shown in FIG. 2, with the following numbering corresponding to that of FIG. 2:

Initially, a bootstrapping stage (not shown) occurs in which Alice 2 and the KMS 1 obtain a shared key, K_A. This can be done by out-of-band means or by using 3GPP GBA (TS 33.220) or the like. Similarly, Bob 3 and the KMS 1 also obtain a shared key, K_B, as shown in FIG. 1.

S7. Alice 2, wishing to communicate with Bob 3, sends a (protected, e.g. authenticated) request to the KMS 1 for a "ticket". This message may contain information about the communication session with Bob 3 and parameters necessary for security (algorithms, a nonce RAND_A, etc).

S8. The KMS 1 checks that the request is authorized and if so generates a key, K_KMS_AB.

S9. The key is protected (e.g. encrypted) using K_A and returned to Alice 2. The key is also encoded in a ticket, targeted for Bob 3, i.e. this ticket contains a copy of K_KMS_AB, encrypted by some key K', similar to that shown in FIG. 1. Alice 2 can decrypt using K_A and recover K_KMS_AB.

S10. Alice 2 transfers the ticket (and possibly other parameters, e.g. nonces) to Bob 3 via the session set-up signalling (e.g. SIP).

S11. Bob 3 forwards the ticket to the KMS 1, asking the KMS to "resolve the ticket". This message may contain further cryptographic parameters such as a nonce selected by Bob 3, RAND_B.

S12. Resolving the ticket (in a manner similar to that shown in FIG. 1) means that the KMS 1 extracts (decrypts) K_KMS_AB using K' and re-encrypting it using K_B.

S13. A response is sent back which includes K_KMS_AB, encrypted by K_B. Bob 3 can now decrypt and recover K_KMS_AB.

S14. Bob may now generate a response (e.g. encoded in a SIP message) to send back to Alice 2. This may contain Bob's 3 nonce, RAND_B and possibly other parameters.

At this point Alice 2 and Bob 3 share K_KMS_AB and other parameters, e.g. nonces, cryptographic algorithms, etc. In general any information included in the original ticket can now be assumed shared by Alice 2 and Bob 3. In particular, Alice 2 and Bob 3 can use K_KMS_AB as a basis to secure the SRTP communication by e.g. deriving SRTP encryption keys from K_KMS_AB and similarly configuring other parameters in SRTP, e.g. encryption algorithms, a salt etc.

This is described in more detail in TS 33.328 and RFC6043 (MIKEY_TICKET, defining the details of the ticket handling).

When key management services such as those described above are offered as a service (e.g. by an IMS operator), it is, in most cases, a regulatory requirement for a Law Enforcement Agency (LEA) to be able to perform Lawful Intercept (LI) in order to prevent/solve crime, terrorism, etc. Note that LI here means the ability for LEAs to "eavesdrop" on the communication related to a target for LI, based on a warrant. Since the communication is encrypted, it does not suffice to only obtain access to the encrypted communication. The LEA also needs access to the keys used to encrypt/decrypt the communication. In general, the LEA will need access to all data/information needed to decrypt the traffic and it is typically the responsibility of the IMS operator to deliver this information. Alternatively, depending on specific national regulations, the IMS operator may decrypt and deliver un-encrypted traffic to the LEA. Nevertheless, knowledge of the decryption parameters is needed by the IMS operator.

For example, suppose that Alice 2 is making an IMS call (or in general some data/communications transfer) with another party Bob 3. Suppose further that the LEA issues a warrant to perform LI on communications involving Alice 2. There are now two cases to consider. At the point in time when the IMS operator receives the LI warrant, it can either be the case that:
1. Alice 2 has no current ongoing communications session (with Bob 3 or anybody else), or,
2. Alice 2 has already started a call, e.g. with Bob 3.

In either case, the requirement is that the LI shall be able to commence immediately. In case 1 this is quite simple. Whenever Alice 2 initiates a call, A will contact the KMS 1 and the KMS 1 (or some other entity in the operator's network) may already have been configured to deliver the key(s) and other information to the LEA. Similarly, other nodes involved in setting up communications (SIP servers, media gateways, etc) for A can be configured to "save" and "forward" necessary parameters to the LEA, including (encrypted) traffic. Case 1 can be covered by already known methods. In case 2, however, this will not work.

Currently, standard IMS networks are essentially "stateless" in the sense that they do not generally save parameters used during call set-up. Accordingly, it is therefore currently not possible to enable LI for a call/session that has already started: necessary parameters may no longer be available. A Kerberos-based solution, e.g. like the one defined by 3GPP, could in principle save a copy of the key, K_KMS_AB, previously delivered to Alice 2 (and Bob 3). When the LI warrant later comes, the KMS 1 can then deliver the key to the LEA. However, this is not enough for LI because the key alone is not sufficient to decrypt the media. Specifically, in any secure protocol (such as SRTP, TLS, IPsec, etc) the involved parties (Alice and Bob) do not use the key delivered by the KMS 1 directly. Specifically, they will derive a secondary key, based on the key from the KMS and "nonces" (known as "RAND" above) selected (pseudo) randomly by Alice 2 and Bob 3 without network control. In the IMS example shown in FIG. 2, a session key may take a form such as:

$$K\_session\_AB=KDF(K\_KMS\_AB,RAND\_A, RAND\_B, \ldots )$$

where
K_session_AB: session key between Alice 2 and Bob 3 (used e.g. with SRTP)
KDF: a key derivation function (e.g. HMAC_SHA256 based)
K_KMS_AB: The key delivered from KMS to Alice 2 and Bob 3
RAND_A: random nonce selected by Alice 2
RAND_B: random nonce selected by Bob 3.

The nonces, RAND_A, RAND_B are typically sent between Alice 2 and Bob 3 during session set-up (e.g. included in SIP signalling, corresponding to messages S10 and S14 of FIG. 2).

Thus, the LEA would need to be given K_session_AB which requires knowing, besides K_KMS_AB, also (at least) RAND_A and RAND_B. Other parameters required may include further nonces, (e.g. in the case of SRTP a so called "salt" is needed to decrypt the traffic), other information required to specify initialization vectors (IV) for the encryption algorithm, and encryption algorithms: Alice 2 and Bob 3 may choose which algorithm to use from a set of allowed/supported algorithms. Knowledge of which algorithm Alice 2 and Bob 3 previously selected is thus needed to decrypt the communication by the LEA or elsewhere.

A solution to the above "mid-call-intercept" problem is proposed in 3GPP contribution SA3LI12_017 (ftp://ftp.3gpp.org/TSG_SA/WG3_Security/TSGS3_LI/2012_44_Barcelona/SA3LI12_01 7.zip). In this proposed solution the KMS shares not only K_A with Alice 2, but also a second key here denoted K_A'. Next, the solution proposes that Alice 2 does not select RAND_A at random, but rather as a (pseudo random) function of K_A' and a new nonce N_A., for example $$RAND\_A=F(K\_A',N\_A)$$

This will enable e.g. KMS 1, to re-generate RAND_A if it is given access to N_A. To address this, the solution proposes that N_A is included in every SRTP media packet (as part of the packet header, e.g. the SRTP Master Key Identifier (MKI) field) sent between Alice 2 and Bob 3. Similarly, Bob 3 is also assumed to have a second key shared with KMS, K_B' from which it generates its RAND_B using a nonce N_B. Hence, also nonce N_B needs to be included every SRTP packet.

If a LI request arrives at the IMS operator in mid-call (or session) between Alice 2 and Bob 3, some entity having access to media plane SRTP packets can extract the N_A, N_B values from the packets. Combining this information with K_A' and K_B' (available at the KMS) enables derivation of the keys used by Alice 2 and Bob 3, by first deriving the RAND_A and RAND_B values, and from them and the key K_KMS_AB (also obtained from the KMS) deriving the key corresponding to K_session_AB. This solution has several drawbacks:

- It imposes a second shared key between Alice 2 (and Bob 3) and the KMS 1, adding to key management overhead/complexity.
- It imposes restrictions on client implementations: they need to use a pre-defined method to generate RAND-values. This may lower the security level. Another contribution to 3GPP, S3-120175 demonstrated that a similar approach would reduce the security if used in conjunction with one particular key management scheme.
- The bandwidth overhead is large. Each SRTP packet must include at least N_A and N_B. For security, these values should be of the order of 16 octets each, leading to 32 octet overhead per packet. This means a 50-100% overhead for typical audio SRTP packet sizes.

The solution is incomplete as it does not address how to retrieve other necessary parameters, e.g. the aforementioned SRTP salt, the cryptographic algorithms, etc. It is unclear if the need to retrieve also these values would further increase bandwidth overhead due to the need to encode even more information in each packet.

In patent application US 2007/0297418 a method for lawful intercept is disclosed. This method is, like the aforementioned SA3LI12_017 based on the network keeping a copy of the key used by the users. A difference though is that this disclosure teaches that the network (intermittently) requests the keys from the users. As such, it would in principle allow mid-call interception. However, there are several drawbacks of such an approach. First of all, the network would need to more or less constantly poll the users for keys, to not allow a user to deduce from a key request that they are subject to intercept, since LI solutions have service requirements that users must not be able to do so. Secondly, the solution addresses only the need for keys and non-cryptographic data such as CODEC information, and does not handle other cryptographic parameters necessary for LI.

SUMMARY

It is an object of the invention to provide a method and apparatus that allows Lawful Intercept of encrypted communications in a communication network, even after a call or session has been started. According to a first aspect, there is provided a method of providing access to an encrypted communication between a sending node and a receiving node to a Law Enforcement Agency (LEA). A Key Management Server (KMS) function stores cryptographic information used to encrypt the communication at a database. The cryptographic information is associated with an identifier used to identify the encrypted communication between the sending node and the receiving node. The KMS receives a request originating from a LEA for Lawful Intercept, the request including an identity of a target for Lawful Interception. The KMS uses the target identity to determine the identifier, and retrieves the cryptographic information associated with the identifier from the database. The cryptographic information can be used to decrypt the encrypted communication. The KMS then sends either information derived from the cryptographic information or a decrypted communication towards the LEA. This advantageously allows the LEA to obtain a decrypted version of the communication regardless of whether the encrypted communication started before or after a warrant for LI was issued.

As an option, the KMS function receives from the sending node, a request for a ticket: The request contains cryptographic information relating to the sending node. The KMS generates a first key to be used by the sending node, a ticket, and the KMS stores the first key and sending node cryptographic information associated with the identifier in the database. The KMS sends the first key and ticket and information related to the identifier to the sending node. The KMS receives from the receiving node a request, the request message including the ticket, information related to the identifier and further cryptographic information relating to the receiving node. The KMS then generates a second key to be used by the receiving node, and receiving node cryptographic information, associated with the identifier in the database. The second key is then sent to the receiving node.

In an optional embodiment, the KMS function is provided in more than one KMS. In this case, the step of generating the second key comprises information exchange between at least two of the KMSs. This allows the method to be implemented when the sending and receiving nodes are served by different KMSs.

The identifier is optionally derived using at least any of a timestamp, implicit knowledge of the current time, a sequence number associated with the session, a ticket identifier, a key identifier, and a session identifier.

As an option, the identifier is derived using the identities of at least one of the sending node and receiving node.

According to a second aspect, there is provided a method of establishing an encrypted communication between a sending node and a receiving node. The sending node sends a request for a ticket to a KMS, the request containing cryptographic information relating to the sending node. The sending node receives KMS a key and information associated with an identifier from the KMS, the identifier being usable by the KMS to identify cryptographic information relating to the communication and stored at a database. The sending node sends the ticket and identifier to the receiving node to establish the encrypted communication session with the receiving node. Second information derived from the information associated with the identifier is included in packets sent to the receiving node in the encrypted communication. This advantageously allows a LEA to obtain a decrypted version of the communication regardless of whether the encrypted communication started before or after a warrant for LI was issued.

According to a third aspect, there is provided a method of establishing an encrypted communication between a sending node and a receiving node. The receiving node receives from a request to establish the encrypted communication from the sending node. The request includes a ticket and information associated with an identifier, the identifier being usable by a KMS function to identify cryptographic information relating to the communication and stored at a database. The receiving node sends a request message to the KMS, the request message including the information associated with the identifier and further cryptographic information relating to the receiving node. The receiving node receives a second key from the KMS to be used by the receiving node, and stored at a database. Second information derived from the information associated with the identifier is included in packets sent in the encrypted communication.

As an option, the receiving node further sends to the sending node information related to the generation of the second key to establish the encrypted communication between the sending node and receiving node.

In an optional embodiment, the second information derived from the information associated with the identifier is sent in the encrypted communication in any of a Secure Real-time Transport Protocol MKI header field, a Real-time Transport Protocol-extension header, an authentication tag, an additional field in a Secure Real-time Transport Protocol header, an additional field in a Real-time Transport Protocol header, and as an additional contributing source in a list of contributing sources in a Real-time Transport Protocol header.

According to a fourth aspect, there is provided a method of providing Lawful Interception of an encrypted communication between a sending node and a receiving node. A Lawful Intercept (LI) node receives packets relating to the encrypted communication, the packets including information associated with an identifier, the identifier being associated with cryptographic information used to encrypt the communication and stored in a KMS. A request is sent to a KMS, the request including the information associated with the identifier. The LI node receives either the cryptographic information associated with the identifier or a decrypted version of the encrypted communication and sends the cryptographic information associated with the identifier and/or the decrypted version of the encrypted communication towards a LEA, which can therefore obtain a decrypted version of the communication regardless of whether the encrypted communication started before or after a warrant for LI was issued.

According to a fifth aspect, there is provided a KMS that is provided with a processing function for storing at a database cryptographic information used to encrypt a communication between a sending node and receiving node, the cryptographic information being associated with an identifier. A receiver is provided for receiving a request originating from a LEA for Lawful Intercept, the request including an identity of a target for Lawful Interception. The processing function is configured to use the target identity to determine the identifier, and retrieve from the database the cryptographic information associated with the identifier, the cryptographic information usable to decrypt the encrypted communication. A transmitter is provided for sending the cryptographic information towards the LEA.

As an option, the receiver is arranged to receive from the sending node a request for a ticket, the request containing cryptographic information relating to the sending node. In this case, the KMS further comprises a generation function for generating a first key to be used by the sending node, the key and sending node cryptographic information being associated with the identifier in the database. The transmitter is further arranged to send the key, the ticket and information related to the identifier to the sending node. The receiver is further arranged to receive from the receiving node a request, the request message including the ticket, information related to the identifier and further cryptographic information relating to the receiving node. The generation function is further arranged to generate a second key to be used by the receiving node, the second key and receiving node cryptographic information being associated with the identifier in the database. The transmitter is further arranged to send the second key to the receiving node.

According to a sixth aspect, there is provided a sending node for use in a communication network. The sending node is provided with a transmitter for sending to a KMS a request for a ticket, the request containing cryptographic information relating to the sending node. A receiver is provided for receiving from the KMS a key, a ticket and information associated with an identifier, the identifier being usable by the KMS to identify cryptographic information relating to the communication and stored at a database. The transmitter is further arranged to send to the receiving node the ticket and information associated with the identifier to establish the encrypted communication session with the receiving node. A processor is provided that is arranged to include second information derived from the information associated with the identifier in packets sent to the receiving node in the encrypted communication.

According to a seventh aspect, there is provided a receiving node for receiving an encrypted communication from a sending node. The receiving node is provided with a receiver for receiving from the sending node a request to establish the encrypted communication, the request including a ticket and information associated with an identifier, the identifier being usable by a KMS function to identify cryptographic information relating to the communication and stored at a database. A transmitter is provided for sending to the KMS function a request message, the request message including the ticket, information associated with the identifier and further cryptographic information relating to the receiving node. The receiver is arranged to receive from the KMS function a second key to be used by the receiving node, and stored at a database. A processor is provided that is arranged to include second information derived from the information associated with the identifier in packets sent in the encrypted communication.

As an option, the transmitter is further arranged to send to the sending node information relating to the generation of the second key to establish the encrypted communication.

According to an eighth aspect, there is provided a LI node for use in a communications network. The LI node is provided with a receiver for receiving packets relating to an encrypted communication between a sending node and a receiving node, the packets including information associated with an identifier, the identifier being associated with cryptographic information used to encrypt the communication. A transmitter is provided for sending a request to a KMS to provide encryption information for an encrypted communication, the request including the information associated with the identifier. The receiver is arranged to receive any of the cryptographic information associated with the identifier and a decrypted version of the encrypted communication. The transmitter is further arranged to send the cryptographic information associated with the identifier and/or the decrypted version of the encrypted communication towards a LEA.

According to a ninth aspect, there is provided a computer program comprising computer readable code means which, when run on a computer apparatus, causes the computer apparatus to perform any of the methods described above. There is also provided a computer program product comprising a computer readable medium and a computer program as described above, wherein the computer program is stored on the computer readable medium.

DETAILED DESCRIPTION

The following description refers to a sending node as Alice and a receiving node as Bob. More generally, the sending node can in the use-cases addressed by the invention be considered a "communication-initiating" node and the receiving node can be considered a "communication-responding" node. Note that the "receiving node" can also be a group of receivers, e.g. if Alice participates in some group communication scenario, e.g. voice/video multiparty conferencing. The invention also covers forking scenarios, e.g. when Alice directs an invitation to a group of receivers and wherein any single member of the group may respond to ("pick up") the call. For example, if the call is directed to *@corporate.com and wherein any authorized user belonging to the domain corporate.com may respond.

The KMS 1 is extended by functionality to store parameters from the ticket-carrying messages so that the KMS 1 can later (if needed, e.g. due to LI) retrieve necessary/relevant LI parameters. Note that the contribution SA3LI12_017 implicitly assumes that the KMS already stores the key corresponding to K_KMS_AB. As mentioned above, IMS networks may be essentially stateless and it is therefore desirable to maintain this property as much as possible. However, the KMS 1 must maintain state, even without any LI requirements. The KMS 1 must at least keep copies of the keys shared with Alice 2 and Bob 3 (K_A and K_B) which, as mentioned, are obtained from a GBA (3GPP TS 33.220) procedure. Since such a cryptographic state is thus already present, it is deemed acceptable to slightly expand on this state, adding other parameters to enable mid-session LI. Note however that keeping this extra LI state information in the KMS 1 is merely one of several possible embodiments. A separate server, external to the KMS could keep this state as discussed in more detail below.

Figure 1:
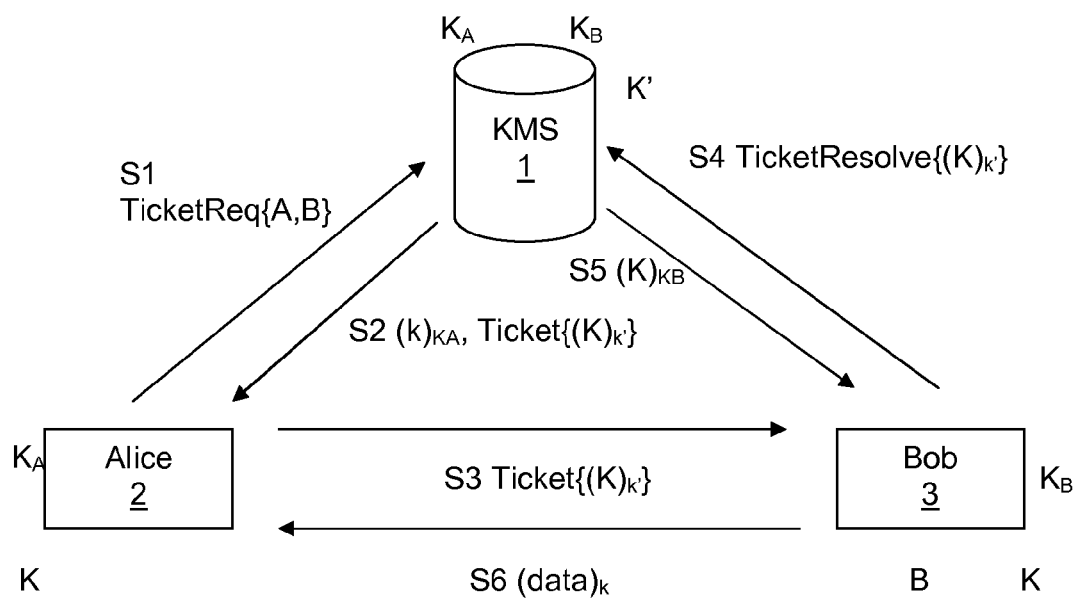
FIG. 1 illustrates schematically in a block diagram the Kerberos principle allowing one party to send encrypted data to another party.
Figure 2:
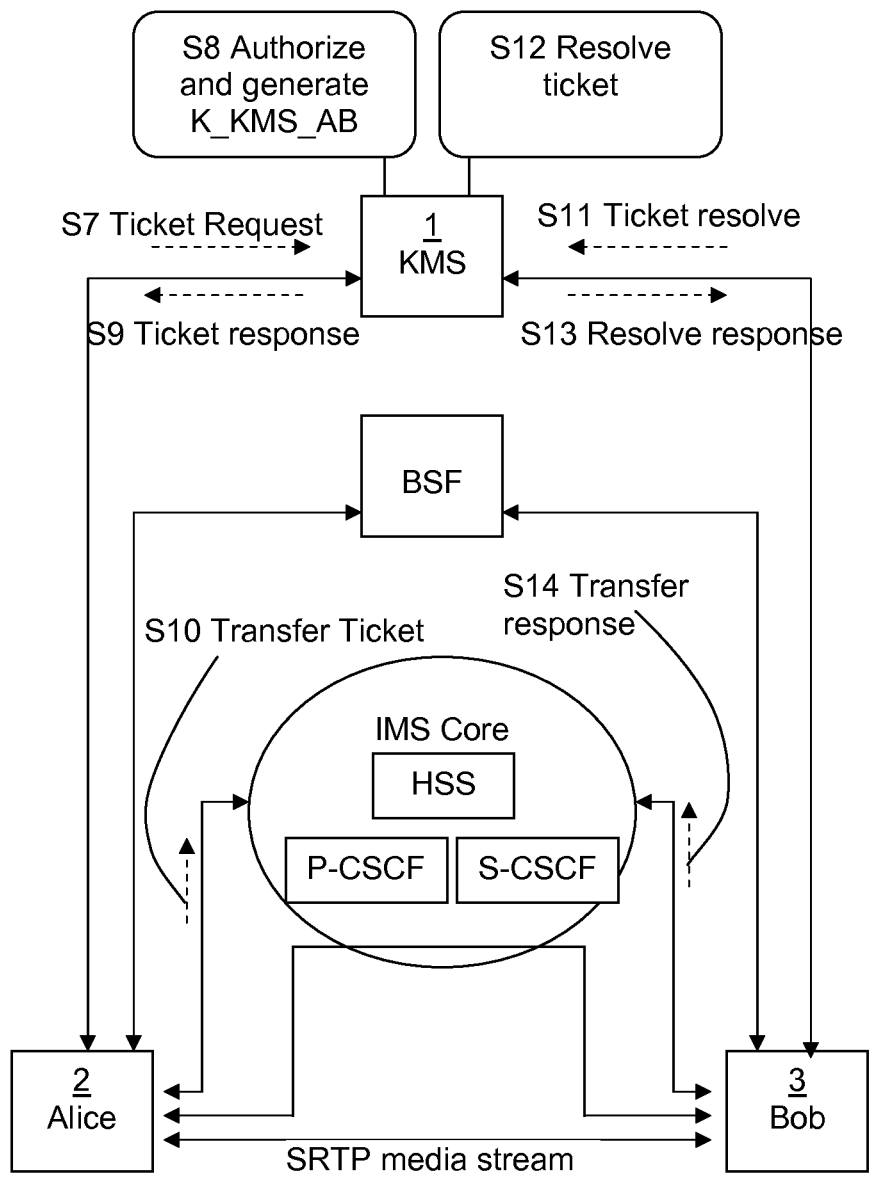
FIG. 2 illustrates schematically in a block diagram a network architecture and signalling for a 3GPP key management solution.
Figure 3:
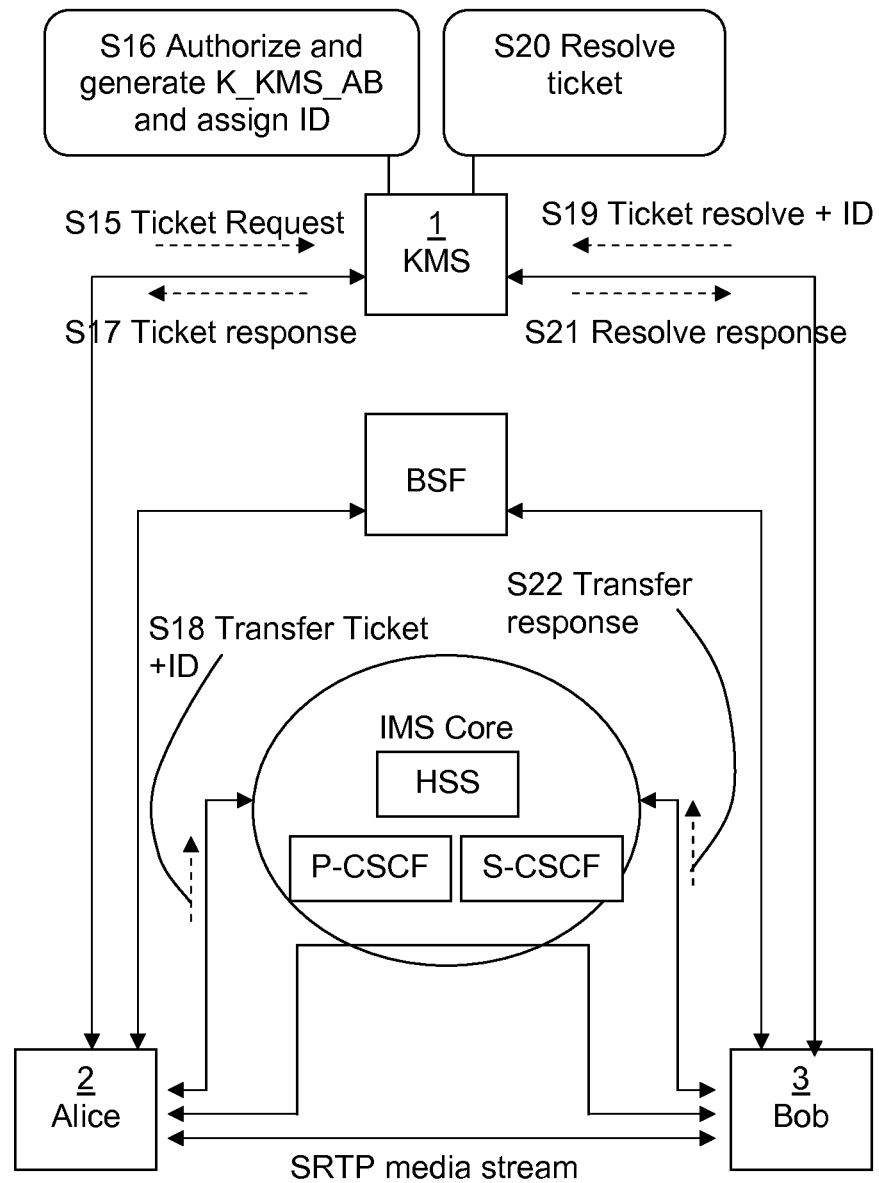
FIG. 3 illustrates schematically in a block diagram a network architecture and signalling for a 3GPP key management solution according to an embodiment of the invention.

Referring to FIG. 3, example signalling illustrating an embodiment of the invention is shown. The following numbering corresponds to that of FIG. 3:

S15. Alice 2, wishing to communicate with Bob 3, sends a (protected, e.g. authenticated) request to the KMS 1 for a ticket. This message may contain information about the session and parameters necessary for security (algorithms, a nonce RAND_A, etc).

S16. The KMS 1 checks that the request is authorized and if so generates a key, K_KMS_AB. In addition, the KMS 1 assigns an ID associated with the ticket (this may or may not be related to the TICKET ID as defined in RFC 6043). This ID is used as an index into a database. The KMS 1 stores K_KMS_AB and other relevant data, e.g. RAND_A and associates the data with the index ID (or an index derivable from the ID).

S17. The key is protected (e.g. encrypted) using K_A and returned to Alice 2. The key is also encoded in a ticket, targeted for Bob 3, i.e. this ticket contains a copy of K_KMS_AB, encrypted by some key K'. The message also contains the ID (or some other value from which ID can be derived). The ID may be a parameter field of the ticket. Alice 2 can decrypt using K_A and recover K_KMS_AB. Alice 2 also extracts and stores ID for later use. Alice 2 may also receive the ID (or some other value from which ID can be derived) by other means (for example in another message) as long as she is able to associate it with the data mentioned in step S16. The value from which the ID may be derived may, for example, be a timestamp, implicit knowledge of the current time, a sequence number carried in a protocol used in the session, a session identifier carried in some other protocol associated with the session, the aforementioned TICKET ID from RFC6043, etc.

S18. Alice 2 transfers the ticket (and possibly other parameters, e.g. nonces) to Bob 3 via the session set-up signalling (e.g. SIP). In addition, the ID is also encoded in the message.

S19. Bob 3 forwards the ticket and the ID to the KMS 1, asking the KMS 1 to resolve the ticket. Resolving a ticket comprises verifying its validity and checking Bob's authority to obtain the key associated with the ticket. This message may contain further cryptographic information such as a nonce selected by Bob 3, RAND_B. It may also include a value from which the RAND_B can be computed by both Bob 3 and the KMS 1. Such a value could be an explicit or implicit sequence number added for this purpose or an existing sequence number from another protocol which is re-used, a timestamp, some other value that is unique for the session (used in conjunction with something that is unique to Bob 3, e.g., his identity in NAI format). Other examples can be envisioned.

S20. In order to resolve the ticket, the KMS 1 extracts (decrypts) K_KMS_AB using K', verifies that the ticket is valid and is allowed to be resolved by Bob, and re-encrypts it using K_B. The KMS 1 also updates the database entry indexed by ID (or and index derivable from the ID) by relevant parameters, e.g. RAND_B. The KMS 1 may have to perform a calculation to derive the value to insert in the entry indexed by ID, depending on which value Bob 3 included in step S19. The KMS 1 may also chose to insert the value(s) received from Bob 3 into the table directly and perform the necessary calculations once the final value is first needed.

S21. A response is sent back which contains K_KMS_AB, encrypted by K_B. Bob 3 can decrypt and recover K_KMS_AB. Bob 3 also extracts and records ID if the ID was carried in this message. If the message did not carry the ID, for the same reasons as given in step S17, Bob derives the ID accordingly in some other way. The ID may for example have been in encrypted form in message S18, in which case Bob 3 can only extract it after receiving the response from the KMS.

S22. Bob 3 may now generate a response to send back to Alice 2. This may contain Bob's 3 nonce, RAND_B and possibly other parameters. Bob 3 may need to perform some calculations on the data he received from the KMS to be able to produce, e.g., RAND_B, if RAND_B can be derived from said data. For example, the KMS 1 may return a timestamp, which Bob 3 shall use together with the key he shares with the KMS 1 to derive RAND_B. The key point is that the KMS 1 has full information on what value Bob 3 will derive and send to Alice 2.

At this point, SRTP packets can start to flow between Alice 2 and Bob 3. In each packet, Alice 2 and Bob 2 includes an encoding of the ID or information derived from the ID that allows the KMS 1 to recover the ID. In a preferred embodiment, the SRTP MKI header field is used to carry this encoding. Other options are also possible for encoding the ID in the SRTP packets. Examples include carrying the ID in an RTP-extension header, carrying it in a part of the authentication tag, addition of a new field to the RTP or SRTP header, adding it as a contributing source in the list of contributing sources (the CSRC field) at the end of the RTP header.

Note now that the above described procedure provides the KMS 1 with access to all relevant parameters (including RANDs etc) should an LI order arise in mid-session. Note that the ID (and its encoding) can be fairly short since it only needs to uniquely identify the database entry at the KMS 1. Indeed, the KMS 1 may make use of an extended index:

ID=(ID_Alice,ID_Bob,ID_AB).

and use that to index its database. By adding Alice's 2 and Bob's 3 own identities, the ID_AB only needs to be unique per pair of communicating entities, e.g. a single octet would typically be sufficient. Alice 2 and Bob 3 then only need to included/encode ID_AB in the media/SRTP) packets. Since ID_AB is not used in any key derivations, there is (unlike the aforementioned SA3LI12_017) no security impact of using a short ID_ AB. Also note that client implementations may use any method to generate RAND-values as it does not depend on ID. If the SRTP MKI field is used to encode ID_AB, it can be used in such a way so as to be fully backwards compatible with an existing client SRTP implementation by using ID_AB as an identifier for which key to use, as the ID_AB is a key identifier.

It is possible for the parameters that build up the ID as shown above to be run through a hash function whose output may or may not be truncated. The result could be used as an ID that can be made statistically unique for all practical purposes. For example, using the, say, 80 rightmost bits of the output of SHA256 would most likely yield a unique value for all calls that would need mid-call intercept.

As noted, the KMS used by Bob 3 and the KMS used by Alice 2 may be two separate KMSs, for example if Alice 2 and Bob 3 use different IMS operators. If they are separate, they must synchronize their data for the system to work. However, this synch is needed not only for LI purposes. If the KMS of Alice 2 and Bob 3 are different, then when Bob 3 asks to resolve the ticket in step S19, the KMS of Bob will (as part of processing, step S20) need to communicate with the KMS of Alice 2 that originally issued the ticket. The KMSs can, if needed, exchange the LI-relevant parameters (e.g. keys, RAND-values, etc) to ensure that they have the same information. This means that if the two KMSs/IMS operators belong to separate legal jurisdictions, the LEA of either of these jurisdictions will be able to perform LI independently, without any need to transfer additional information about subscribers who are a target for lawful interception across the different domains.

The above description describes a general embodiment of the invention in the context of any type of packet switched network. The following description describes a specific implementation in the context of a 3GPP IMS network. One of skill in the art will realize that any setting in which a Kerberos-like key management service is deployed can make use of the same solution. The only differences lie in which protocols are used to transport keys/tickets (MIKEY_Ticket, HTTP, UDP, etc.) and which security protocol is used to secure communication between Alice 2 and Bob 3 (SRTP, PSK-TLS, IPsec, etc.). This is simply an issue of message format/transport. The impact of different choices for the security protocol lies in which parameters that are needed to perform LI, i.e. to decrypt. These parameters in some embodiments could comprise any or all of:

the key provided by the KMS 1 (i.e. corresponding to K_KMS_AB above),
nonces/RANDs used to derive keys (i.e. RAND_A etc above),
nonces/salts used in the security protocol (e.g. the SRTP salt),
selected cryptographic algorithms,
counters or other synchronization information (e.g. the SRTP roll-over counter, ROC).

In the following description, the term "cryptographic LI information" (CLII) is used to refer to the parameters necessary for the LEA (and/or IMS operator) to decrypt encrypted data. This may comprise any of the above examples. In an embodiment of the invention, the identity (called ID) used to identify the CLII is encoded in the SRTP MKI field. It will be appreciated that alternative mechanisms may be used, and this is used by way of example only. For example, if a security protocol other than SRTP is used, it will be appreciated that a different protocol specific field may be used. For example, in the case of IPsec the SPI-field or some other IP header (extension) field may be used.

Figure 4:
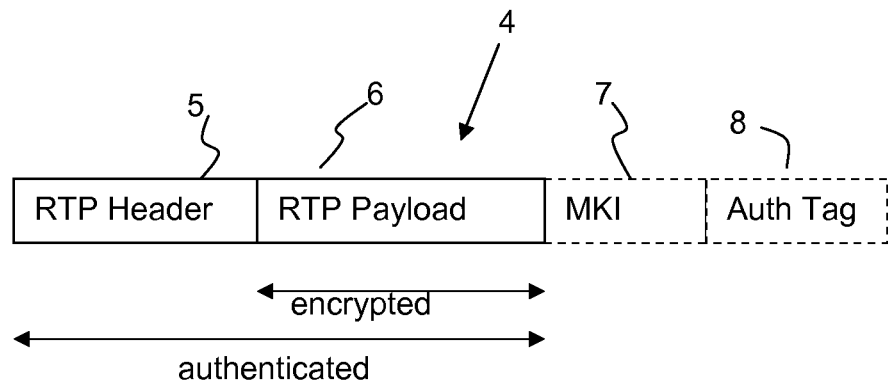
FIG. 4 illustrates an SRTP data packet format.

Referring to FIG. 4 herein, an SRTP data packet according to IETF RFC3711 is illustrated. As mentioned, other protocols will have similar data fields, e.g. the IPSec Security Parameters Index (SPI) field. The SRTP packet 4 includes an RTP header 5 and an RTP payload 6. The payload 6 is typically encrypted and the header 5 and payload 6 are typically authenticated. An MKI field 7 may also be present (usage is optional), and is used to tell Alice/Bob which key to use to process the packet 4 when received. Each SRTP session has an associated cryptographic context comprising keys, algorithms and other parameters necessary for Alice/Bob to process the received packet. Thus, in general Alice 2 and Bob 3 may have number of such contexts, and each context may further have several keys. Alice 2 and Bob 3 will use IP address and (UDP) port number to retrieve the correct cryptographic context (as described in RFC3711). Given the context, the MKI 7 is then used to determine which key (within the cryptographic context) to use. For example, suppose that a cryptographic context has two keys, K_AB1, K_AB2. Alice 2 and Bob 3 somehow agree to associate K_AB1 with MKI_ AB1 and K_AB2 with MKI_AB2. When Alice 2 sends an encrypted packet to Bob 3, she either includes MKI_AB1 or MKI_AB2 in the packet's MKI field 7, depending on which key she used to process (encrypt) the packet. Bob 3 can thus, by inspecting the MKI field 7, deduce whether to use K_AB1 or K_AB2 to process (decrypt).

The MKI field 7 may be short, only one or two bytes. It only needs to be unique within the cryptographic context. In particular, it would suffice if the MKI is unique for all SRTP session between for Alice 2 and Bob 3, and typically there will only be a small number of such sessions.

When MIKEY-TICKET is used, the tickets can carry information regarding MKI 7 (or in general, SPI-type of information). The nodes in the IMS operator network (e.g. the KMS 1) will therefore have access to the MKI field 7 of the tickets.

Effectively, the KMS will use (Identity_A, Identity_B, MKI) as an identifier/index for the CLII, whereas only part of this identifier, the MKI, is included in packets sent between Alice 2 and Bob 3.

Figure 5:
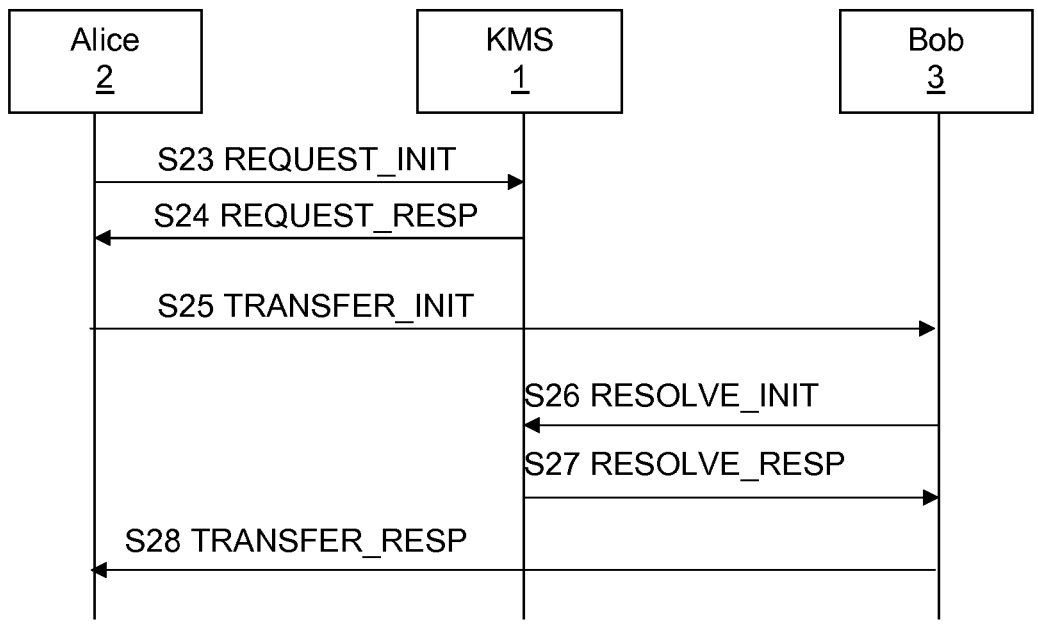
FIG. 5 is a signalling diagram showing signalling to set up a session according to an embodiment of the invention.

Referring to FIG. 5, there is illustrated session set-up signalling (adapted from 3GPP TR 33.328). The following numbering corresponds to the steps of FIG. 5:

S23. When the KMS 1 receives a REQUEST_INIT ("ticket request") from Alice 2, the request will (according to current 3GPP/IETF specifications) comprise CLII related information, e.g. RAND-value (nonce), cryptographic algorithms to be used in SRTP, etc. According to the invention, the KMS 1 stores this CLII. The KMS 1 also generates a key (corresponding to K_KMS_AB) to be returned in the response. The KMS 1 saves also this key (and any other CLII related information generated by the KMS, e.g. further nonces, counters, etc as applicable) as part of the "CLII package". Since the message from the Alice 2 contains identifiers for the Alice 2 and Bob 3, one embodiment uses this pair of identities as part of the index, or CLII identifier by which the KMS 1 references this CLII package. The KMS 1 also adjoins to the MKI (or corresponding value) to the CLII identifier. If Alice 2 did not specify an MKI-value, the KMS 1 may choose MKI on behalf of Alice 2 and include it in the response.

S24. The KMS 1 sends a REQUEST_RESP to Alice 2. At some point after reception of the REQUEST_RESP, Alice 2 populates her database of SRTP cryptographic contexts with the information received from the KMS 1. This includes the key K_KMS_AB and the MKI. Alice 2 associates the key K_KMS_AB with this MKI according to standard SRTP definition.

S25. Alice 2 sends a TRANSFER_INIT to Bob 3. This message includes Bob's 3 ticket, including MKI, other parameters such as RAND_A, algorithms, and an (encrypted) copy of K_KMS_AB, which is made available to Bob 3 using SIP signalling in this example.

S26. Bob 3 sends a RESOLVE_INIT to the KMS 1. When the KMS 1 receives the RESOLVE_INIT, it will look up the entry as indexed by the CLII identifier (i.e. the identities of Initiator and Responder and the MKI as extracted from the received message/ticket). The KMS 1 will add any relevant further CLII related parameters (e.g. RAND_B provided by Bob 3 and/or RAND selected/provided by the KMS 1 itself, etc) and update the CLII information by these value(s), indexed by the CLII identifier.

S27. The KMS 1 returns the resolved ticket (including MKI) to Bob 3. Bob 3 now similarly populates his database of cryptographic contexts, associating K_KMS_AB with the MKI.

S28. Bob 3 sends a TRANSFER RESP to Alice 2.

At some later point in time, SRTP packets will be sent between Alice 2 and Bob 3. These packets (by default all packets, but optionally only some packets) will include the MKI field. Note that to Alice 2 and Bob 3, the MKI is just a master key identifier that is handled according to standard SRTP procedures. They have no knowledge (nor do they need to have such knowledge) of the extended "semantics" of the MKI when used by the KMS 1 as (part of) a CLII identifier.

Figure 6:
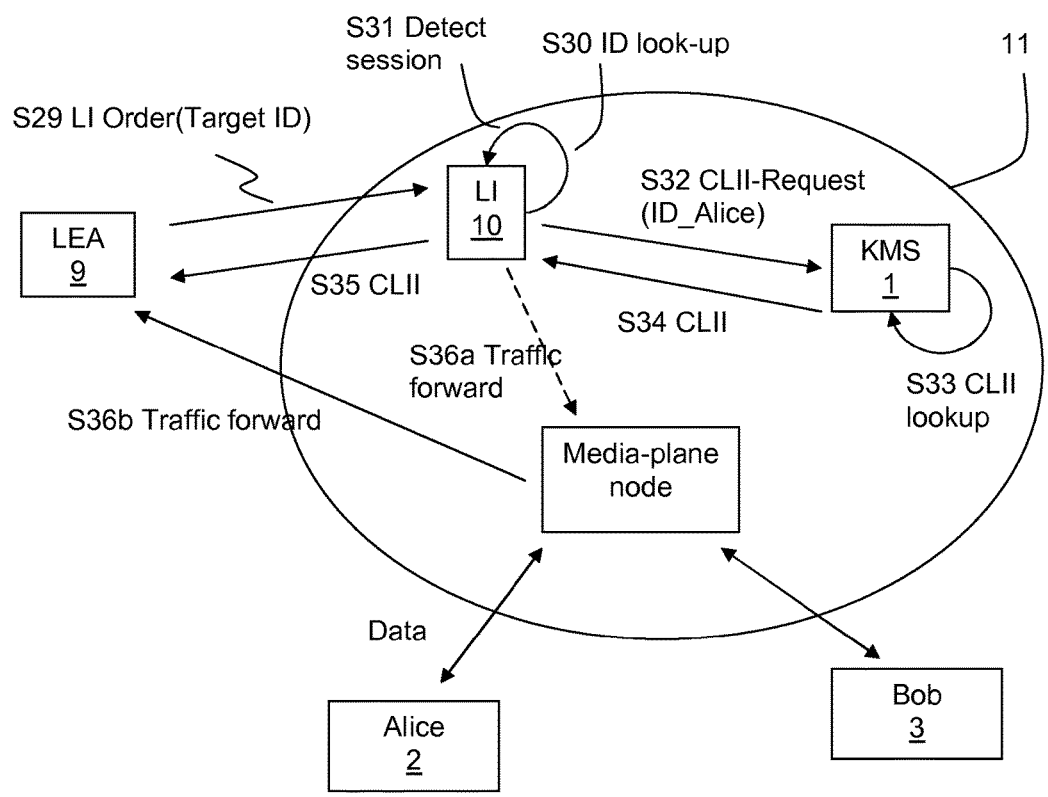
FIG. 6 illustrates schematically in a block diagram a network architecture and signalling for establishing Lawful Interception according to an embodiment of the invention.

Consider now the situation where, after an SRTP communication between Alice 2 and Bob 3 has been started, the LEA issues a request for LI. The procedure is illustrated in FIG. 6, with the following numbering corresponding to that of FIG. 6.

S29. The LEA 9 sends a request for LI to an LI function 10 operated by the IMS operator 11. The request includes an identifier of the LI Target (in this example, the target is Alice 2).

S30. The IMS operator 11 translates the received identifier to some internally used identifier, denoted Target_ID, for the target 2 (exactly how this is done is outside the scope of the invention), i.e. the identifiers used by Alice 2 when requesting tickets as discussed above.

S31. The IMS operator's LI function 10 determines if Alice 2 has at least one ongoing call/session. This could be done, for example, by consulting call control servers (SIP servers), media handling nodes/gateways, databases (e.g. HSS) etc. The exact mechanism for this is outside the scope of this description. If no ongoing session is detected, some LI-preparatory actions may be taken (outside the scope of this description). If an ongoing session is detected, the procedure continues at step S32.

S32. The KMS 1 is contacted and is requested to provide the CLII associated with Alice 2.

S33. The KMS 1 performs a look-up of its database using the supplied identity. For example, it could search for CLII identifiers of form (Target_ID, *, *), (*, Target_ID, *), the "*" signifying a "wild-card" in place of the other parties identifier and the MKI, respectively. Alternatively, if the MKI and/or identity of Alice communicating party are somehow already known, these values may be explicitly included in the CLII look-up.

S34. The KMS 1 retrieves CLII for (all) ongoing sessions for Alice 2 and returns them to the operator's LI function 10, including information to allow correlation between the CLII and the related session. For example, in a case where Alice 2 is involved in more than one session, each session having different session keys and other cryptographic parameters, there is a need to be able to associate each set of CLII with the related session, to ensure that the LEA can match the right keys with the right session. This is described in more detail below.

S35. The operator's LI function 110 provides the CLII (or information derived therefrom) to the LEA 9.

S36. The (encrypted) traffic to/from Alice (the Target) is also made available to LEA 9 by forwarding traffic related to the target of interception from some media-plane node, e.g. SGSN, Media Gateway (MGw), Session Border Gateway (SBG), Media Resource Function (MRF), or the like. The LEA 9 now has the means to decrypt the encrypted traffic.

As a specific embodiment of step S34, rather than providing all CLII information to the LEA 9, the operator's LI function 10 (and/or the KMS 1) may inspect some SRTP packets of the target, in particular the MKI field and retrieve/derive the necessary keys and only provide keys (and possibly other selected relevant parameters) to LEA 9.

Depending on national regulations, as a further alternative mechanism to steps S35 and S36, the LI function 10 may use the CLII and correlation information received in step S34 to decrypt media and send media unencrypted to the LEA 9.

While the LI-preparatory actions mentioned in step S31 are outside the scope of this description, an example of such an LI-preparatory action is suggested. The LI function 10 may, in step S31, instruct or pre-configure the KMS 1 to behave according to step S33 and S34 for each sub-sequent key/ticket REQUEST_INIT made by Alice. This will enable use of exactly the same handling of LI also for calls/sessions that have not been initiated at the time the LI request is received by the LI function 10.

Note that the invention works well regardless of whether the LI Target is the Initiator or Responder (Alice 2 or Bob 3) of the communication. The case of the Initiator has already been described in detail. If the LI Target is the Responder (Bob 3) there are two cases to consider:

If Alice 2 and Bob 3 use the same KMS/IMS Operator, there is no difference. However, if Bob 3 has a separate KMS, possibly in another jurisdiction, Bob's KMS will, using the information encoded in the ticket created by Alice's 2 KMS, be able to provide Bob 3 with all information necessary to derive the shared key, K_KMS_AB, and all other parameters necessary for further key derivation, e.g. RAND-values chosen by Alice 2 etc. Bob 3 and/or Bob's 3 KMS may further select such parameters (e.g. further RAND-values), and these will also be known to the Bob's 3 KMS. Thus, the information available at Bob's KMS (possibly partially obtained by communication with the Initiators' KMS) will enable Bob's 3 KMS to create and store a complete set of CLII information which consequently (if/when an LI warrant is received) can be made available to an LEA of the local jurisdiction as described above.

As mentioned above, the procedure slightly increase the amount of information kept as state in the KMS 1. If this is problematic (e.g. due to memory restrictions in the KMS 1) a separate node/server could maintain this state. The KMS 1 would still be involved in the ticket processing as described, but the storage would be done separately. The KMS 1 would thus have an interface to communicate with this storage node and send CLII information (extracted from tickets and/or locally generated) to this node for storage. Having received a warrant for LI, the operator's LI function 10 could then obtain the CLII information from this storage node instead.

Figure 7:
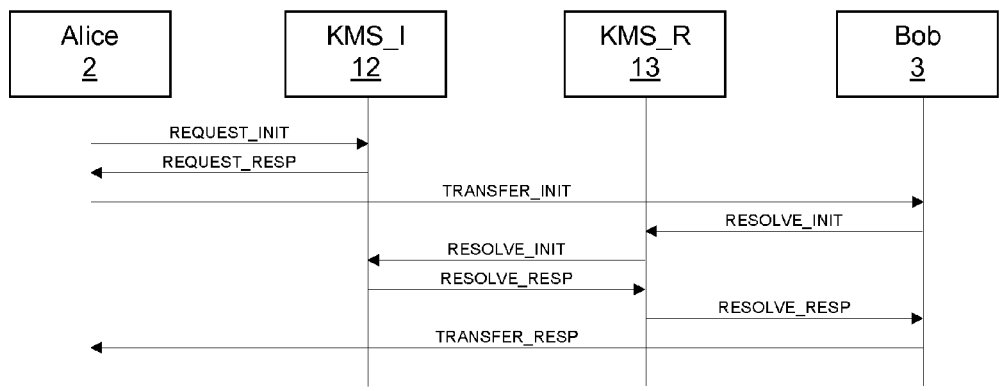
FIG. 7 is a signalling diagram showing signalling to set up a session in an embodiment in which subscribers use different Key Management Servers according to a further embodiment of the invention.

FIG. 7 (adapted from 3GPP TR 33.328) shows the case where Alice 3 has a KMS, KMS_I 12 and Bob 3 has a separate KMS, KMS_R 13. As noted above, KMS_R 13 will by the communication with KMS_I 12 obtain all necessary information to enable Bob 3 to derive the same set of keys and other cryptographic parameters as Alice/KMS_I 12. Consequently, KMS_R 13 will be able to maintain a copy of the same (or equivalent) CLII as that held by KMS_I 12.

An issue arises when the KMSs are separate as shown in FIG. 7, and an LI warrant is issued in the jurisdiction of KMS_I 12 (the case of LI in the jurisdiction of KMS_R 13 has already been described).

Note that Bob 3 and/or KMS_R 13 may choose further CLII-essential parameters (e.g. RAND-values) at (or after) the RESOLVE_INIT message from Bob 3. For example, should KMS_R 13 choose some parameter after the communication with KMS_I 12 is completed, this parameter will not be known to KMS_I 12 which could be a problem if an LI warrant is issued in the jurisdiction of KMS_I 12. Possible solutions to this include:
1. Demand that the KMS_I 12 forwards any additional CLII-relevant information (selected/generated at the "Responder-side") to KMS_R 13 in conjunction with the transfer of the RESOLVE_INIT message to KMS_I 12. In particular, it is demanded that KMS_R 13 does not choose any further CLII parameters after this communication. The CLII of KMS_I 12 is thus updated by the CLII-relevant information as received from KMS_R 13.
2. Extract, at or in connection to KMS_I 12, any additional CLII-relevant information included the final TRANSFER_RESP from Bob 3 to Alice 2. This message will pass through Alice's 2 domain/jurisdiction. KMS_I 12 will have all information needed to decrypt/extract information from this message. After all, Alice 2 must be able to decode this message, and KMS_I 12 also has access to all relevant information/keys for this purpose. After this extraction, the CLII of KMS_I 12 is updated accordingly.

Note that in either case, no information about subscribers who are the target for LI is transferred between the two domains. The information exchanged between the domains is exchanged regardless of whether LI is activated or not, so that it is not possible to detect that the communication is being intercepted.

Where a target for LI is involved in two or more sessions, the correct CLII must be correlated with the correct session, as mentioned above in step S34. First of all the IP address of the LI target is assumed known. E.g. the target will be registered in SIP servers who provide reachability for incoming IMS calls and thus these servers will anyway need to know mapping between user identities and IP addresses, regardless of whether calls are encrypted or not. Part of the invention is to use the MKI (or equivalent) field as a basis for identifying associated CLII. Since MKI is carried in the media packets, the additional knowledge of the identities of the Initiator/Responder can in principle be used to identify the correct CLII. If MKI is assigned by the KMS 1, the KMS 1 can ensure that MKI (with user identifiers) uniquely identifies CLII for each media session. However, if users are responsible for assigning MKI, it could happen that Alice 1 and/or Bob 2 accidentally (or even deliberately) choose colliding MKI for two different sessions, thereby making CLII identification ambiguous. Since it is unlikely that any two users are participating in more than a small number of sessions, the network and/or LEA could simply try all possible CLIIs and one of them will be the correct one. Another option is to let the Identity of the Ticket (MIKEY-Ticket, RFC6043, specifies such an identifier) to be used as (part of) the CLII identifier. This ticket ID (or information from which it can be derived) can be included in the MKI field as discussed above.

Figure 8:
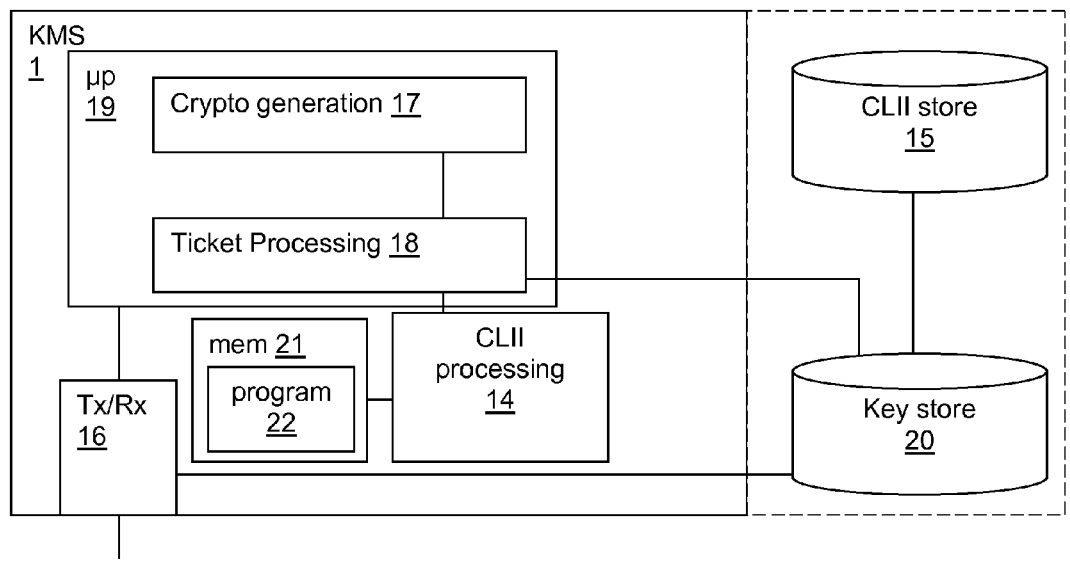
FIG. 8 illustrates schematically in a block diagram a Key Management Server according to an embodiment of the invention.

Referring to FIG. 8, there is illustrated a KMS 1. The KMS may include a processing function 14 and a CLII store 15, or these may be provided in a separate node. The processing function 14 is used, as described above, to the ID associated with the CLII in the CLII store 15. For the sake of clarity, a single transceiver 16 is illustrated, although it will be appreciated that this may be physically embodied by several transmitters and receivers. The transceiver 16 is arranged to receive the request from the LI 10, the request including an identity of a target for Lawful Interception. As a result, the processing function 14 uses the target identity to determine the ID, and retrieve the CLII from the CLII store 15. The transceiver 16 then sends the CLII towards the LEA 9 (or LI 10). The LEA may then use CLII to decrypt the forwarded traffic S36*b*. Alternatively; decryption is made at the media plane node or the LI 10 so that the forwarded traffic S36*b* is already decrypted when it arrives at LEA.

The KMS is also provided with a cryptographic generation function 17 for generating cryptographic materials and a ticket processing function 18 for generating and resolving tickets, in addition to a key store 20. The cryptographic generation function 17 for generating cryptographic materials and the ticket processing function 18 for generating/resolving tickets may be implemented by a single processor 19, or by different processors. The KMS 1 may also be provided with a memory 21 in the form of a computer readable medium. The memory 21 may be used to store a program 22 which, when run by the processor 19, causes the KMS to behave as described above.

Figure 9:
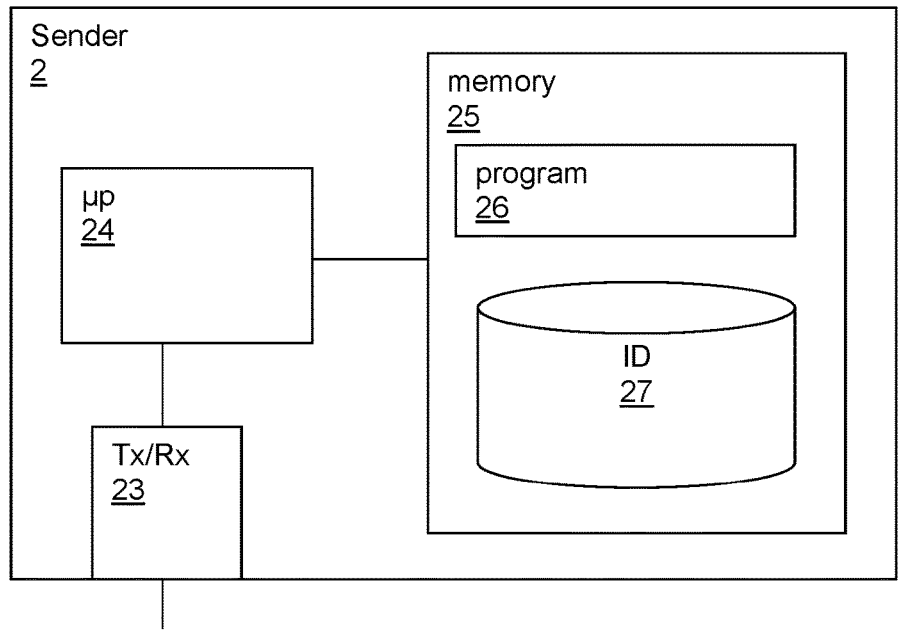
FIG. 9 illustrates schematically in a block diagram a sending node according to an embodiment of the invention.

Referring to FIG. 9 herein, there is illustrated a sender node 2. Again, for clarity a single transceiver 23 is illustrated, but it will be appreciated that this may be embodied as a plurality of transmitters and receivers. The transceiver 23 is arranged to send a request for a ticket to the KMS 1, the request containing cryptographic information relating to the sender node. The transceiver 23 is further arranged to receive a response from the KMS 1 which includes a key, a ticket, and information associated with the ID. The transceiver is also arranged to send to the receiver 3 the ticket and information associated with the ID identifier to establish the encrypted communication session. A processor 24 is provided, which is arranged to include the information associated with the ID in packets sent to the receiver 3 in the encrypted communication. A memory 25 in the form of a computer readable medium may be provided. This can be used to store a program 26 which, when executed by the processor 24, causes the node to behave as described. The memory 25 may also be used to store the information related to the ID 27.

Note that the sender node may not be aware that that it is using the information associated with the ID in the packets. This may be the case, for example, where the KMS 1 provides information to be used in an MKI field. However, it may be that a non-SRTP protocol is used, such as IPSec. Normally, IPsec keys are created using the IKE protocol which takes care of the association between a "key" and a "SPI". Where the method described above is applied in an IPsec environment, the IKE protocol would be replaced with a Kerberos-like protocol (for example, as described in IETF RFC 4430, or using Kerberos directly with IPsec). The mechanism of "populating" the IPSec SA database by SPIs that have not been created by IKE is a new function that the sender (and receiver) would need to perform.

Figure 10:
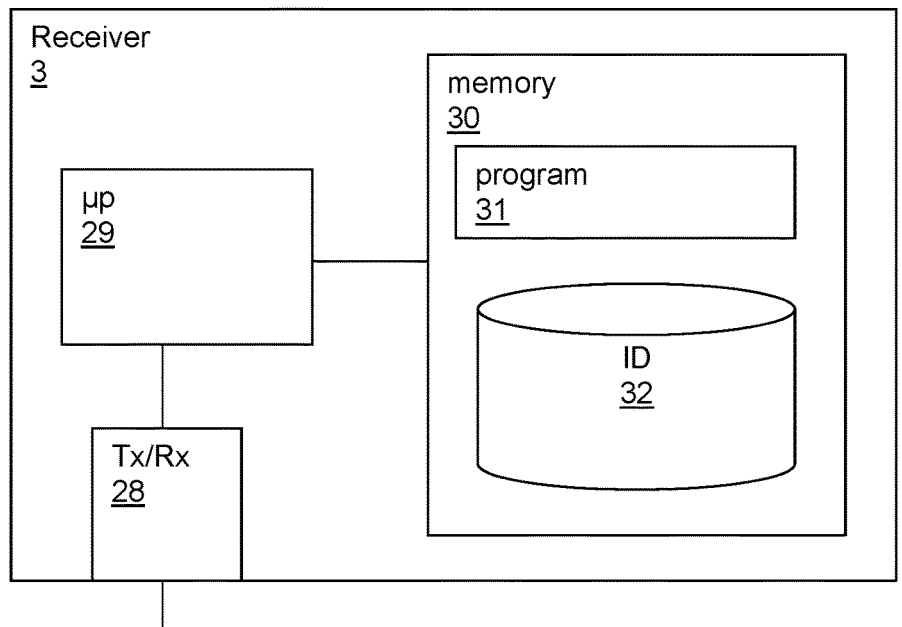
FIG. 10 illustrates schematically in a block diagram a receiving node according to an embodiment of the invention.

Referring to FIG. 10 herein, there is illustrated a receiver node 3. For the sake of clarity, a single transceiver 28 is illustrated, but it will be appreciated that this may be embodied as a plurality of transmitters and receivers. The transceiver 28 is arranged to receive a request to establish the encrypted communication with the sender 2. The request includes a ticket and information associated with the ID. The transceiver 28 is arranged to send to the KMS 1 a request message, the request message including the ticket, the information associated with the ID and further cryptographic information relating to the receiver 3. The transceiver 28 is further arranged to receive from the KMS 1 function a second key to be used by the receiver 3. The transceiver 28 may also be arranged to send cryptographic information (e.g. nonces) regarding the generation of the second key to the sender 2 to establish the encrypted communication session. A processor 29 is arranged to include the information associated with the identifier in packets sent in the encrypted communication. A memory 30 in the form of a computer readable medium may be provided. This can be used to store a program 31 which, when executed by the processor 29, causes the receiver node to behave as described. The memory 30 may also be used to store the information related to the ID 32.

Figure 11:
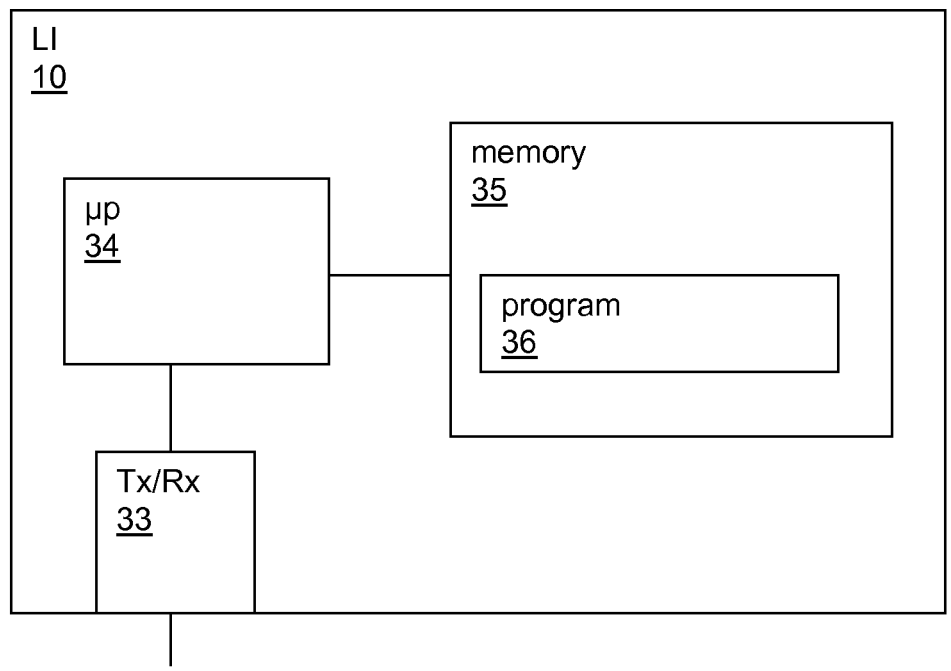
FIG. 11 illustrates schematically in a block diagram a Lawful Intercept node according to an embodiment of the invention.

Referring to FIG. 11 herein, there is illustrated an LI node 10. For the sake of clarity, a single transceiver 33 is illustrated, but it will be appreciated that this may be embodied as a plurality of transmitters and receivers. The transceiver 33 receives packets relating to an encrypted communication between Alice 2 and Bob 3. The packets including information associated with the ID. The transceiver sends a request to the KMS 1, the request including the information associated with the ID. The transceiver is also arranged to receive, from the KMS 1, the CLII. The transceiver 33 is then arranged to send either the CLII or the decrypted version of the encrypted communication towards the LEA 9. Alternatively, the transceiver 33 is arranged to transmit the CLII to a media plane node and instruct the media plane node to use the CLII to decrypt the communication between Alice 2 and Bob 3 and forward it to the LEA 9. A processor 34 is provided for processing the signalling. A memory 35 in the form of a computer readable medium may be provided. This can be used to store a program 36 which, when executed by the processor 34, causes the LI node 10 to behave as described.

The LI node 10 may send the CLII directly to the LEA 9 for the LEA to perform decryption. Alternatively, the LI node 10 may perform decryption itself using the CLII and send the decrypted communication to the LEA 9. In an alternative embodiment, the LI node 10 may send the CLII to a media plane node, which performs the decryption of the encrypted communication and sends the decrypted communication to the LEA 9.

In an embodiment in which the ID is dependent on ticket information, the ticket information may be protected by a key known only to the KMS 1. This prevents tampering with the ID by Alice 2 and/or Bob 3 in the ticket signalling messages. If this protection is not present, there are still actions that can be taken to make the solution more robust. For example, when the KMS 1 receives resolve requests from Bob 3, it could verify that ID is valid (i.e. that it "exists") and that it is associated with the same parties Alice 2 and Bob 3. Alice 2 and Bob 3 could insert incorrect MKI values into SRTP packets. This means that the KMS 1 may not be able to retrieve the correct key. The KMS 1 could then as an option return all CLII:s associated with the target, and the LI node 10 (or LEA 9) could try all these keys.

The invention provides for mid-call/mid-session lawful intercept with minimal bandwidth overhead, no security degradation and transparency to clients.

It will be appreciated by the person of skill in the art that various modifications may be made to the above-described embodiments without departing from the scope of the present invention.

The following acronyms have been used in the above description
3GPP 3rd Generation Partnership Project
CLII Cryptographic LI Information
HSS Home Subscriber Server,
HTTP Hypertext Transfer Protocol
IMS IP Multimedia Subsystem
IPsec Internet Protocol Security
LEA Law Enforcement Agency
LI Lawful Intercept
MKI Master Key Identifier
MSRP Message Session Relay Protocol
NAI Network Access Identifier
RTP Real-time Transport Protocol
SIP Session Initiation Protocol
SPI Security Parameter Index
ROC roll-over counter
SRTP Secure Real-time Transport Protocol
TLS Transport Layer Security
PSK-TLS Transport layer security with pre-shared key(s)
UDP User Datagram Protocol

The invention claimed is:

1. A method of providing access to an encrypted communication between a sending node and a receiving node to a Law Enforcement Agency, the method comprising, at a Key Management Server function, by first:
   storing at a database cryptographic information used to encrypt the communication, the cryptographic information associated with an identifier used to identify the encrypted communication between the sending node and receiving node; then
   receiving a request originating from a Law Enforcement Agency for Lawful Intercept, the request including an identity of a target for Lawful Interception and wherein the request is received after the encrypted communication between the sending node and the receiving node has started; then
   using the target identity to determine the identifier, and retrieving from the database the cryptographic information associated with the identifier, the cryptographic information usable to decrypt the encrypted communication; and then
   sending one of information derived from the cryptographic information and a decrypted communication towards the Law Enforcement Agency.

2. The method according to claim 1, the method comprising, at the Key Management Server function:
- receiving from the sending node, a request for a ticket, the request containing cryptographic information relating to the sending node;
- generating a first key to be used by the sending node, a ticket, and storing the first key and sending node cryptographic information associated with the identifier in the database;
- sending the first key and ticket and information related to the identifier to the sending node;
- receiving from the receiving node a request, the request message including the ticket, information related to the identifier and further cryptographic information relating to the receiving node;
- generating a second key to be used by the receiving node, and receiving node cryptographic information, associated with the identifier in the database;
- sending the second key to the receiving node.

3. The method according to claim 2, wherein the Key Management Server function is provided in more than one Key Management Server and wherein the step of generating the second key comprises information exchange between at least two of the more than one Key Management Servers.

4. The method according to claim 1, wherein the identifier is derived using at least any of a timestamp, implicit knowledge of the current time, a sequence number associated with the session, a ticket identifier, a key identifier, and a session identifier.

5. The method according to claim 1, wherein the identifier is derived using the identities of at least one of the sending node and receiving node.

6. A method of providing Lawful Interception of an encrypted communication between a sending node and a receiving node, the method comprising, at a Lawful Intercept node, by first
- receiving packets relating to the encrypted communication, the packets including information associated with an identifier, the identifier being associated with cryptographic information used to encrypt the communication and stored in a Key Management Server; then
- sending a request to a Key Management Server, the request including the information associated with the identifier, and wherein the request is sent after the encrypted communication between the sending node and the receiving node has started; then
- receiving any of the cryptographic information associated with the identifier and a decrypted version of the encrypted communication; and then
- sending the cryptographic information associated with the identifier and/or the decrypted version of the encrypted communication towards a Law Enforcement Agency.

7. A Key Management Server, KMS, for use in a communications network, the KMS comprising:
- a processing function for first storing at a database cryptographic information used to encrypt a communication between a sending node and receiving node, the cryptographic information being associated with an identifier;
- a receiver for then receiving a request originating from a Law Enforcement Agency for Lawful Intercept, the request including an identity of a target for Lawful Interception, and wherein the request is received after the encrypted communication between the sending node and the receiving node has started;
- wherein the processing function is configured to then use the target identity to determine the identifier, and then retrieve from the database the cryptographic information associated with the identifier, the cryptographic information usable to decrypt the encrypted communication; and
- a transmitter for then sending the cryptographic information towards the Law Enforcement Agency.

8. The KMS according to claim 7, wherein the receiver is arranged to receive from the sending node a request for a ticket, the request containing cryptographic information relating to the sending node, the KMS further comprising:
- a generation function for generating a first key to be used by the sending node, the key and sending node cryptographic information being associated with the identifier in the database;
- the transmitter being further arranged to send the key, the ticket and information related to the identifier to the sending node;
- the receiver being further arranged to receive from the receiving node a request, the request message including the ticket, information related to the identifier and further cryptographic information relating to the receiving node;
- the generation function being further arranged to generate a second key to be used by the receiving node, the second key and receiving node cryptographic information being associated with the identifier in the database;
- the transmitter being further arranged to send the second key to the receiving node.

9. A Lawful Intercept node for use in a communications network, the Lawful Intercept node comprising:
- a receiver for first receiving packets relating to an encrypted communication between a sending node and a receiving node, the packets including information associated with an identifier, the identifier being associated with cryptographic information used to encrypt the communication;
- a transmitter for then sending a request to a Key Management Server to provide encryption information for an encrypted communication, the request including the information associated with the identifier, and wherein the request is sent after the encrypted communication between the sending node and the receiving node has started;
- the receiver being further arranged to then receive any of the cryptographic information associated with the identifier and a decrypted version of the encrypted communication; and
- the transmitter being further arranged to then send the cryptographic information associated with the identifier and/or the decrypted version of the encrypted communication towards a Law Enforcement Agency.

10. The method according to claim 1, wherein the method is performed by a processor, which when executed, performs the method of a computer program comprising computer readable code means, stored on a memory.

11. The method according to claim 1, wherein the method is performed by a computer program stored on a non-transitory computer readable medium.

* * * * *

UNITED STATES PATENT AND TRADEMARK OFFICE
CERTIFICATE OF CORRECTION

PATENT NO. : 10,432,606 B2
APPLICATION NO. : 14/370862
DATED : October 1, 2019
INVENTOR(S) : Naslund et al.

Page 1 of 1

It is certified that error appears in the above-identified patent and that said Letters Patent is hereby corrected as shown below:

In the Specification

In Column 4, Line 31, delete "N_A.," and insert -- N_A, --, therefor.

In Column 10, Line 55, delete "Bob 2" and insert -- Bob 3 --, therefor.

In Column 11, Line 6, delete "." after equation.

In Column 11, Line 12, delete "media/SRTP)" and insert -- media/SRTP --, therefor.

In Column 12, Line 35, delete "MKI__ AB1" and insert -- MKI_AB1 --, therefor.

In Column 13, Line 35, delete "TRANSFER RESP" and insert -- TRANSFER_RESP --, therefor.

In Column 16, Line 6, delete "Alice 1" and insert -- Alice 2 --, therefor.

In Column 16, Line 7, delete "Bob 2" and insert -- Bob 3 --, therefor.

In Column 17, Line 1, delete "that that" and insert -- that --, therefor.

In Column 18, Line 26, delete "Server," and insert -- Server --, therefor.

Signed and Sealed this
Nineteenth Day of May, 2020

Andrei Iancu
*Director of the United States Patent and Trademark Office*